United States Patent [19]

Sakai et al.

[11] Patent Number: 4,788,015
[45] Date of Patent: Nov. 29, 1988

[54] PROCESS FOR PREPARATION OF OPTICAL DISK SUBSTRATE

[75] Inventors: Kazunari Sakai, Chiba; Yoshio Yokokawa, Sakura, both of Japan

[73] Assignee: Dainippon Ink and Chemical Inc., Tokyo, Japan

[21] Appl. No.: 135,412

[22] Filed: Dec. 21, 1987

[30] Foreign Application Priority Data

Dec. 23, 1986 [JP] Japan ................ 61-305446

[51] Int. Cl.⁴ .............. B29C 35/08; B29C 43/20; B29D 11/00
[52] U.S. Cl. .................. 264/1.3; 264/1.4; 264/22; 264/107
[58] Field of Search ............ 264/1.3, 1.4, 107, 22

[56] References Cited

U.S. PATENT DOCUMENTS 4,477,328 10/1984 Broeksema et al. ............ 264/1.4
4,650,845 3/1987 Hegel .......................... 264/1.4
4,734,477 3/1988 Inoue et al. .................... 264/1.3

Primary Examiner—James Lowe
Attorney, Agent, or Firm—Armstrong, Nikaido, Marmelstein & Kubovcik

[57] ABSTRACT

A process for the preparation of a substrate for an optical disk having spiral or concentric guide grooves formed on the surface thereof, which comprises the steps of casting a radiation- and heat-curable liquid resin mixture between a duplicating mold and a transport substrate, curing the liquid resin mixture by irradiating it with radiation from the side of the transparent substrate, peeling the molded body from the duplicating mold and heat-polymerizing the obtained molded body by heating, wherein a mixture comprising a liquid resin having a terminal acrylic group and/or a terminal methacrylic group and an organic peroxide is used as the radiation- and heat-curable liquid resin mixture.

5 Claims, 1 Drawing Sheet

PROCESS FOR PREPARATION OF OPTICAL DISK SUBSTRATE

BACKGROUND OF THE INVENTION

1. Field of the Invention

The present invention relates to a process for the preparation of an optical disk to be used for a disk memory or the like. More particularly, the present invention relates to a process for the preparation of a substrate of an optical disk, in which spiral or concentric guide grooves formed on a duplicating mold such as a stamper are exactly duplicated, the adhesion of a liquid resin mixture layer to a transparent substrate is greatly improved, and if a heat resistance test is carried out after a metallic recording layer is formed on a layer of a cured product of the liquid resin mixture, no wrinkles are formed on the recording layer.

2. Description of the Related Art

Disk substrates capable of recording, reproducing, and erasing light information are generally formed by etching signal pits and guide grooves(pre-grooves) for tracking an optical head with a high precision on the surface thereof.

As a means for a mass-production of optical information-recording media having fine signal pits or guide grooves formed thereon, a method has been adopted in which a mother block having signal pits or guide grooves formed thereon is first prepared and a plastic material is injection-molded or compression-molded by using this block as a mold.

However, this injection molding method or compression molding method is defective in that a large-size molding machine must be used and the transfer precision is poor.

As a means of overcoming these defects, a duplication method in which signal pits are formed on a radiation-curable resin layer has been studied by Polygram Co. and Phillips Co., and the results of their researches are disclosed in Japanese Unexamined Patent Publication No. 51-140601 (Polygram), Japanese Unexamined Patent Publication No. 53-116105 (Phillips), Japanese Unexamined Patent Publication No. 54-130902 (Phillips), Japanese Examined Patent Publication No. 54-138406 (Phillips), and Japanese Unexamined Patent Publication No. 55-4793 (Phillips).

According to this method, a liquid radiation-curable resin layer is thinly formed on the surface of a duplicating mold such as an original disk or a stamper (a metal mold formed by duplication of the original disk by electrocasting), a colorless transparent plastic substrate is placed on this resin layer, and the assembly comprising the resin layer gripped between the duplicating mold and the substrate is irradiated with radiation to cure the resin layer. Then, the cured resin layer having signal pits duplicated thereon, and the plastic substrate integrated with the cured resin layer, are peeled from the duplicating mold to obtain an information-recording medium.

However, the adhesion between the radiation-curable resin and the plastic substrate is generally poor.

When a heat-setting resin substrate having properties desirable for a light information-recording medium, such as a broad application temperature range and an ability to resist warping by an absorption of moisture, is used as the plastic substrate, the adhesion to the radiation-curable resin layer is especially poor.

As a means for obtaining a complete adhesion, a method can be considered in which the radiation-curable resin is modified and given a soft structure. However, where a soft structure is given to the radiation-curable resin, if a metallic recording layer, for example, a photomagnetic recording layer, is formed on the radiation-curable resin layer by vacuum deposition, sputtering or the like, and a heat resistance test is carried out, fine wrinkles are easily formed on the recording layer, although the cause of this is unknown. The formed wrinkles contribute to a generation of noise during recording and reproduction, and the signal-to-noise ratio (SN or CN ratio) is drastically reduced.

SUMMARY OF THE INVENTION

Under this background, a primary object of the present invention is to provide a process for the preparation of an optical disk substrate, in which a strong adhesion is maintained between a transparent substrate and a layer of a cured product of a liquid resin mixture having spiral or concentric guide groves formed thereon, even if the disk substrate is used for a long time in a high-humidity high-temperature environment, whereby the life of the disk can be prolonged, and even if a metallic recording layer is formed on the layer of the cured product of the liquid resin mixture and a heat resistance test is then carried out, fine wrinkles are not formed on the recording layer and, therefore, a high signal-to-noise ratio is maintained.

To attain this object, the present inventors prepared optical disk substrates according to various preparation processes and examined the characteristics of these optical disks, and as a result, found that, if a specific liquid resin mixture is cured with radiation and heat polymerization is then carried out, an excellent adhesion between the cured liquid resin layer and a transparent substrate can be attained and, if a metallic recording layer is formed on the cured liquid resin layer and the heat resistance test is then carried out, fine wrinkles are not formed on the recording layer. The present invention was completed based on this finding.

More specifically, in accordance with the present invention, there is provided a process for the preparation of a substrate for an optical disk having spiral or concentric guide grooves formed on the surface thereof, which comprises the steps of casting a radiation- and heat-curable liquid resin mixture between a duplicating mold and a transparent substrate, curing the liquid resin mixture by irradiating it with radiation from the side of the transparent substrate, peeling the molded body from the duplicating mold, and heat-polymerizing the obtained molded body by heating, wherein a mixture comprising a liquid resin having a terminal acrylic group and/or a terminal methacrylic group and an organic peroxide is used as the radiation- and heat-curable liquid resin mixture.

DESCRIPTION OF THE PREFERRED EMBODIMENTS

Figure 1:
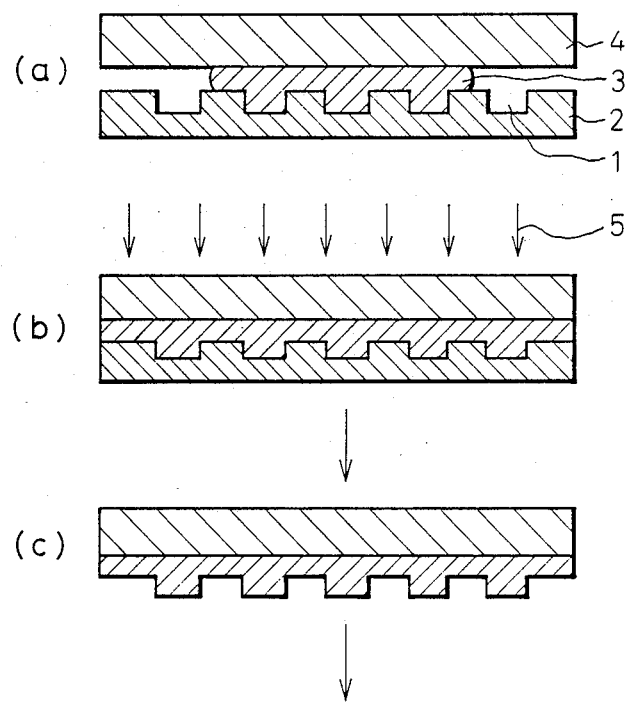
FIGS. 1-a, 1-b, and 1-c are diagrams illustrating the process of the present invention, in which reference numeral 2 represents a stamper, reference numeral 3 represents a liquid resin mixture, reference numeral 4 represents a transparent substrate, and reference numeral 5 represents a radiation.

As the radiation- and heat-curable liquid resin having a terminal acrylic group and/or a methacrylic group used in the present invention, there can be mentioned an acrylic acid and/or methacrylic acid ester of an epoxy resin, an acrylic acid and/or methacrylic acid ester of a polyester resin, an acrylic acid and/or methacrylic acid ester of a polyether resin, an acrylic acid and/or methacrylic acid ester of a polybutadiene resin, and a polyurethane resin having an acrylic group and/or a methacrylic group at the molecule ends.

Since these radiation- and heat-curable reactive oligomers and polymers having a terminal acrylic group and/or a terminal methacrylic group have a high viscosity, they may be used after dilution thereof with a monomer having radiation reactivity and heat reactivity, which has an acrylic group and/or a methacrylic group, according to need. As the reactive monomer, there can be mentioned monofunctional monomers such as ethyl (meth)acrylate, hydroxyethyl (meth)acrylate, n-butyl (meth)acrylate, hexyl (meth)acrylate, 2-ethylhexyl (meth)acrylate, phenyl (meth)acrylate, phenylcellosolve (meth)acrylate, n-vinylpyrrolidone, isobornyl (meth)acrylate and dicyclopentadiene-oxyethyl (meth)acrylate, difunctional monomers such as diethylene glycol di(meth)acrylate, neopentyl glycol di(meth)acrylate, 1,6-hexane-diol di(meth)acrylate, polyethylene glycol di(meth)acrylate, 2,2-bis(4-(meth)acryloyloxypolyethylene-oxyphenyl)propane and 2,2-bis(4-(meth)acryloyloxypolypropyleneoxyphenyl)propane, trifunctional monomers such as trimethylolpropane tri(meth)acrylate and trimethylolethane tri(meth)acrylate, and tetrafunctional monomers such as pentaerythritol tetra(meth)acrylate.

If a reaction monomer as described above is appropriately combined with the reactive oligomer or reactive polymer, the softness of the radiation- and heat-curable liquid resin layer can be optionally adjusted, and if a soft structure is imparted to the radiation- and heat-curable liquid resin layer, a strong adhesion to the transparent substrate can be obtained.

However, if the liquid resin having such a soft structure is cured only with radiation, when a metallic recording layer is formed on the cured liquid resin layer by vacuum deposition, sputtering or the like, and the heat resistance test is then carried out, fine wrinkles are formed on the recording layer.

A method in which a liquid resin is cured with radiation, the molded body is peeled from a duplicating mold, and the obtained molded body is heat-treated is disclosed in Japanese Unexamined Patent Publication No. 60-113345. According to this method, however, the formation of wrinkles cannot be avoided.

This problem of a formation of wrinkles can be solved, according to the present invention, by using a mixture of a radiation- and heat-curable liquid resin having a terminal acrylic group and/or a terminal methacrylic group and an organic peroxide.

As the organic peroxide that can be used in the present invention, there can be mentioned ketone peroxides such as methylethylketone peroxide, cyclohexanone peroxide, 3,3,5-trimethylcyclohexanone peroxide, methylcyclohexanone peroxide, and acetylacetone peroxide; peroxyketals such as 1,1-bis(t-butylperoxy)-3,3,5-trimethylcyclohexane, 1,1-bis(t-butylperoxy)cyclohexane, n-butyl-4,4-bis(t-butylperoxy)valerate, and 2,2-bis(t-butylperoxy)butane; hydroperoxides such as t-butyl hydroperoxide, cummene hydroperoxide, diisopropylbenzene hydroperoxide, p-methane hydroperoxide, 2,5-dimethylhexane-2,5-dihydroperoxide, and 1,1,3,3-tetramethylbutyl hydroperoxide; dialkyl peroxides such as di-t-butyl peroxide, t-butylcumyl peroxide, dicumyl peroxide, α,α'-bis(t-butylperoxyisopropyl)benzene, 2,5-dimethyl-2,5-di(t-butylperoxy)hexane, and 2,5-dimethyl-2,5-di(t-butylperoxy)hexene-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, and m-toluoyl peroxide; peroxydicarbonates such as diisopropyl peroxydicarbonate, di-2-ethylhexyl peroxydicarbonate, di-n-propyl peroxydicarbonate, di-2-ethoxyethyl peroxydicarbonate, dimethoxyisopropyl peroxydicarbonate, di(3-methyl-3-methoxybutyl) peroxydicarbonate, and acetylcyclohexylsulfonyl peroxydicarbonate; peroxyesters such as t-butyl peroxyacetate, t-butyl peroxyisobutyrate, t-butyl peroxypivalate, t-butylperoxy-2-ethyl hexanoate, t-butyl peroxylaurate, t-butyl peroxybenzoate, and 2,5-dimethyl-2,5-di(benzoylperoxy)hexane; and azobis compounds such as α,α'-azobisisobutyronitrile.

If a curing promotor such as a cobalt complex amine is used in combination with the organic peroxide, the heat polymerization time can be greatly shortened.

Note, a photopolymerization initiator, a defoaming agent, a surface active agent for increasing the wettability with a stamper, and an unreactive thermoplastic resin for reducing the curing shrinkage can be added to the liquid resin mixture of the present invention.

As the transparent substrate used in the present invention, there can be mentioned substrates of thermosetting resins such as epoxyvinyl ester resins, epoxy resins, and unsaturated polyester resins. A substrate of a thermoplastic resin such as a polymethyl methacrylate resin is effectively used, so long as deformation of the substrate is not caused by the heat treatment adopted in the process of the present invention Namely, a thermosetting resin substrate is preferred as the transparent substrate to be applied to the process for the preparation of an optical disk substrate according to the present invention.

The process for the preparation of an optical disk substrate according to the present invention will now be described with reference to the accompanying drawings.

FIG. 1 is a diagram illustrating an embodiment of the process for the preparation of an optical disk substrate according to the present invention.

For the preparation of the optical disk substrate of the present invention, a liquid resin mixture layer 3 as described above is formed on the light information-recording surface of a transfer mold 2, for example, according to the wet coating method.

Then, for example, a transparent substrate 4 is set on the liquid resin mixture layer 3 (see FIG. 1-a).

In the state where the liquid resin mixture layer 3 is thus supported between the substrate 4 and the transfer mold 2, the liquid resin mixture layer 3 is irradiated with radiation 5 such as electron beams, γ-rays, X-rays, and ultraviolet rays, through the transparent substrate 4 to cure the liquid resin mixture layer 3 (see FIG. 1-b).

Then, the layer 3 of the cured product of the liquid resin mixture having spiral or concentric guide grooves duplicated thereon is parted from the transfer mold 2 together with the substrate 4 (see FIG. 1-c).

Finally, the obtained groove-formed substrate is heated to effect heat polymerization. The heat treatment temperature is not particularly critical, but preferably, the heat treatment is carried out at a temperature of 100° to 160° C. If the heat treatment temperature is lower than 100° C., it takes a long time to complete the heat polymerization, and the productivity is degraded. If the heat treatment temperature is higher than 160° C., the time required for completing the heat polymerization is shortened and the productivity is increased, but extreme discoloration occurs in the layer of the cured product of the liquid resin mixture and the transparent substrate.

Where the heat treatment is not carried out, if a metallic recording layer is formed on the layer of the cured product of the liquid resin mixture and the heat resistance test is carried out, fine wrinkles are formed on the recording layer and the optical disk substrate cannot be put to practical use.

The present invention will now be described in detail with reference to the following examples.

EXAMPLES 1 THROUGH 7

A liquid resin mixture shown in Table 1 was dropped on a nickel stamper having spiral guide grooves on the surface and a thickness of 0.3 mm and the liquid resin mixture was expanded by a transparent substrate shown in Table 1. When the thickness of the liquid resin mixture layer was reduced to 50 microns, the nickel stamper and transparent substrate were fixed. In this state, the assembly was irradiated for 15 seconds with rays from a high-pressure 80 W/cm mercury lamp through the transparent substrate. The layer of the cured product of the liquid resin mixture was removed from the interface with the nickel stamper and the obtained guide groove-formed transparent substrate was heat-treated at a temperature shown in Table 1 for a time shown in Table 1 to obtain an optical disk substrate.

The results of a cross-cut adhesive tape peeling test for examining the adhesion between the cured liquid resin mixture layer and the transparent substrate, and the degree of discoloration of the substrate by the heat treatment, are shown in Table 1.

A photomagnetic recording layer and a protecting layer were formed on the optical disk substrate under the conditions described below and according to the magnetron sputtering method.

Conditions for formation of Tb-Fe-Co type photomagnetic magnetic recording layer Thickness: 1000 Å
Film-forming method: high-frequency magnetron sputtering method
Vacuum degree in chamber: $5 \times 10^{31\ 7}$ Torr
Introduced Ar pressure: $5 \times 10^{-3}$ Torr
High-frequency electric power: 250 W
Target composition: $Tb_{27}.Fe_{68}.Co_5$ (atomic %)

Conditions for formation of $Si_3N_4$ type protecting layer

Thickness: 1000 Å
Film-forming method: high-frequency magnetron sputtering method
Vacuum degree in chamber: $5 \times 10^{-7}$ Torr
Introduced $Ar/N_2$ (10/10) pressure: $1 \times 10^{-2}$ Torr
High-frequency electric power: 600 W
Target composition: $Si_3N_4$ A substrate of the same material was bonded to the optical disk substrate through an adhesive so that the photomagnetic recording layer and protecting layer formed under the above-mentioned conditions were located on the inner side, whereby a photomagnetic disk was prepared. The heat resistance test was carried out at 85° C. for 100 hours or at 100° C. for 100 hours, and the formation of wrinkles was checked. Furthermore, the temperature at which wrinkles were formed was determined by a heating test conducted for 5 hours.

TABLE 1

(Examples)

| Example No. | Substrate Material | Liquid Resin Mixture | Heat Treatment Temperature | Time | Formation of Wrinkles after Heating at 85° C. for 100 Hours |
|---|---|---|---|---|---|
| 1 | epoxy | 1*1 | 140° C. | 4 hours | not observed |
| 2 | epoxyvinyl ester | 1 | 140° C. | 4 hours | not observed |
| 3 | epoxyvinyl ester | 2*2 | 140° C. | 4 hours | not observed |
| 4 | epoxyvinyl ester | 1 | 110° C. | 10 hours | not observed |
| 5 | epoxyvinyl ester | 1 | 160° C. | 2 hours | not observed |
| 6 | unsaturated polyester | 1 | 140° C. | 4 hours | not observed |
| 7 | polymethyl methacrylate | 1 | 100° C. | 2 hours | not observed |

| Example No. | Formation of Wrinkles after Heating at 100° C. for 100 Hours | Temperature at Which Wrinkles Were Not Formed under Heating for 5 Hours*3 | Adhesion*4 | Discoloration by Heat Treatment |
|---|---|---|---|---|
| 1 | not observed | 140° C. | 25 | not caused |
| 2 | not observed | 140° C. | 25 | not caused |
| 3 | not observed | 150° C. | 25 | not caused |
| 4 | not observed | 120° C. | 25 | not caused |
| 5 | not observed | 140° C. | 25 | slight |
| 6 | not observed | 140° C. | 25 | not caused |

TABLE 1-continued

| | | (Examples) | | |
|---|---|---|---|---|
| 7 | observed | 100° C. | 25 | not caused |

Note
*[1] resin 1 comprised 30 parts of bifunctional urethane acrylate having a weight average molecular weight of 5,000, 10 parts of neopentyl glycol diacrylate, 30 parts of hydroxyethyl acrylate, 30 parts of N—vinylpyrrolidone, 1 part of Perbutyl O (supplied by Nippon Yushi), and 2 parts of Irgacure 651 (supplied by Ciba-Geigy)
*[2] resin 2 comprised 30 parts of bifunctional urethane acrylate having a weight average molecular weight of 3,000, 30 parts of dipropylene glycol diacrylate, 10 parts of hydroxyethyl acrylate, 30 parts of N—vinylpyrrolidone, 1 part of Perbutyl 0, and 2 parts of Irgacure
*[3] upper limit temperature at which wrinkles were not formed even by heating for 5 hours
*[4] adhesive cellophane tape peeling test using 25 square cross-cuts, "25" indicating no peeling and "0" indicating peeling of all the square cross-cuts

COMPARATIVE EXAMPLES 1 THROUGH 7

Optical disk substrates were prepared in the same manner as described in Examples 1 through 7 by using the liquid resin mixtures and transparent substrates shown in Table 2. Note, in Comparative Examples 3 and 7, the heat treatment was omitted. The adhesion and the discoloration of the substrate were evaluated. Then, a photomagnetic recording layer and a protecting layer were formed in the same manner as described in Examples 1 through 7, a substrate of the same material was bonded, the heat resistance test was carried out in the same manner as described in Examples 1 through 7, and the formation of wrinkles was checked. The results are shown in Table 2.

resistance was relatively poor, but the heat resistance was sufficient in a normal environment.

In each of Comparative Examples 1 and 2, since the organic peroxide was not incorporated in the liquid resin mixture, when the heat treatment was performed, wrinkles were formed in the heat resistance test. In Comparative Examples 3 and 4, since the heat treatment was not carried out or since the heat treatment temperature was too low, wrinkles were formed in the heat resistance test. In Comparative Example 5, since the heat treatment temperature was too high, discoloration of the substrate was extreme, and the optical disk substrate could not be put to practical use. In Comparative Example 6, the substrate was deformed by the heat treatment. In Comparative Example 7, since a liquid

TABLE 2

(Comparative Examples)

| Comparative Example No. | Substrate Material | Liquid Resin Mixture | Heat Treatment Temperature | Heat Treatment Time | Formation of Wrinkles after Heating at 85° C. for 100 Hours |
|---|---|---|---|---|---|
| 1 | epoxyvinyl ester | 3*[5] | 140° C. | 4 hours | observed |
| 2 | epoxyvinyl ester | 3 | 160° C. | 4 hours | observed |
| 3 | epoxyvinyl ester | 1 | not performed | | observed |
| 4 | epoxy | 1 | 80° C. | 10 hours | observed |
| 5 | epoxy | 1 | 170° C. | 1 hour | not observed |
| 6 | polymethylmethacrylate | 1 | 120° C. | 2 hours | — |
| 7 | epoxyvinyl ester | 4*[6] | not performed | | not observed |

| Comparative Example No. | Formation of Wrinkles after Heating at 100° C. for 100 Hours | Temperature at Which Wrinkles Were Not Formed under Heating for 5 Hours | Adhesion | Discoloration by Heat Treatment |
|---|---|---|---|---|
| 1 | observed | 60° C. | 25 | not caused |
| 2 | observed | 80° C. | 25 | slight |
| 3 | observed | 50° C. | 25 | — |
| 4 | observed | 60° C. | 25 | not caused |
| 5 | not observed | 140° C. | 25 | caused |
| 6 | — | — | — | — |
| 7 | not observed | 120° C. | 0 | — |

Note
*[5] resin 3 had the same composition as that of resin 1 except that Perbutyl 0 was not incorporated
*[6] resin 4 comprised 30 parts of bifunctional urethane acrylate having a weight average molecular weight of 1,000, 50 parts of neopenty glycol diacrylate, 10 parts of hydroxyethyl acrylate, and 2 parts of Irgacure 651

In each of Examples 1 through 6, the adhesion between the cured liquid resin mixture layer and the transparent substrate was good, and when the heat resistance test was carried out at 85° C. for 100 hours or at 100° C. for 100 hours, wrinkles were not formed. In Example 4, the heat treatment had to be conducted for a long time to obtain a sufficient heat resistance, but no practical problem arose. In Example 5, some discoloration was observed in the transparent substrate, but the light transmission in the wavelength region of 780 to 830 nm was substantially the same as the light transmission before the heat treatment and no practical problem arose. In Example 7, since the substrate was composed of polymethyl methacrylate and the heat treatment could not be performed at a high temperature, the heat resin mixture composed mainly of a urethane acrylate having a low molecular weight and a polyfunctional monomer was used, even if the heat treatment was not carried out, a high heat resistance was obtained, but the adhesion to the substrate was poor and the optical disk substrate could not be put to practical use.

The characteristics of a photomagnetic disk prepared by using the optical disk substrate obtained in Example 3 were measured. More specifically, a signal of 1 MHz was written with a laser light quantity of 6 mW at a disk rotation number of 1800 rpm, and the signal was reproduced with a reproduction light quantity of 1 mW. The CN ratio was measured at a band width of 30 kHz by a spectrum analyzer. It was found that the CN ratio was 56 dB.

The heat resistance test conducted at 85° C. for 100 hours, and no degradation of the CN ratio occurred. However, after the heat resistance test conducted at 100° C. for 100 hours, the CN ratio was degraded by about 3 dB but no practical problem arose.

As is apparent from the foregoing description, according to the preparation process of the present invention, the adhesion between the layer of the cured product of the liquid resin mixture and the transparent substrate is excellent, and guide grooves formed on the duplicating mold are exactly duplicated. Furthermore, as proved by the heat resistance test, wrinkles are not formed in a recording layer formed by laminating a metal alloy and a nitride on the layer of the cured product of the liquid resin mixture, and a high CN ratio (signal-to-noise ratio) is maintained. Namely, a process for preparing an excellent optical disk substrate is provided according to the present invention, and the industrial applicability of the present invention is very high.

We claim:

1. A process for the preparation of a substrate for an optical disk having spiral or concentric guide grooves formed on the surface thereof, which comprises steps of casting a radiation- and heat-curable liquid resin mixture between a duplicating mold and a transparent parent substrate, curing the liquid resin mixture by irradiating it with radiation from the side of the transparent substrate, peeling the molded body from the duplicating mold and heat-polymerizing the obtained molded body by heating, wherein a mixture comprising a liquid resin having a terminal acrylic group and/or a terminal methacrylic group and an organic peroxide is used as the radiation- and heat-curable liquid resin mixture.

2. A process according to claim 1, wherein the liquid resin is selected from arylic acid and/or methacrylic acid esters of an epoxy resin, acrylic acid and/or methacrylic acid esters of a polyester resin, acrylic acid and/or methacrylic acid esters of a polyether resin, acrylic acid and/or methacrylic acid esters of a polybutadiene resin, and polyurethane resins having an acrylic group and/or a methacrylic group at the molecule ends.

3. A process according to claim 1, wherein the organic peroxide is selected from ketone peroxides such as methylethylketone peroxide, cyclohexanone peroxide, 3,3,5-trimethylcyclohexanone peroxide, methylcyclohexanone peroxide, and acetylacetone peroxide; peroxyketals such as 1,1-bis(t-butylperoxy)-3,3,5-trimethylcyclohexane, 1,1-bis(t-butylperoxy)cyclohexane, n-butyl-4,4-bis(t-butylperoxy)valerate, and 2,2-bis(t-butylperoxy)butane; hydroperoxides such as t-butyl hydroperoxide, cummene hydroperoxide, diisopropylbenzene hydroperoxide, p-methane hydroperoxide, 2,5-dimethylhexane-2,5-dihydroperoxide, and 1,1,3,3-tetramethylbutyl hydroperoxide; dialkyl peroxides such as di-t-butyl peroxide, t-butylcumyl peroxide, dicumyl peroxide, α,α'-bis(t-butylperoxyisopropyl)benzene, 2,5-dimethyl-2,5-di(t-butylperoxy)hexane, and 2,5-dimethyl-2,5-di(t-butylperoxy)hexene-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, and m-toluoyl peroxide; peroxydicarbonates such as diisopropyl peroxydicarbonate, di-2-ethylhexyl peroxydicarbonate, di-n-propyl peroxydicarbonate, di-2-ethoxyethyl peroxydicarbonate, dimethoxyisopropyl peroxydicarbonate, di(3-methyl-3-methoxybutyl) peroxydicarbonate, and acetylcyclohexylsulfonyl peroxydicarbonate; peroxyesters such as t-butyl peroxyacetate, t-butyl peroxyisobutyrate, t-butyl peroxypivalate, t-butylperoxy-2-nethyl hexanoate, t-butyl peroxylaurate, t-butyl peroxybenzoate, and 2,5-dimethyl-2,5-di(benzoylperoxy)hexane; and azobis compounds such as α,α'-azobisisobutyronitrile.

4. A process according to claim 1, wherein the transparent substrate is a substrate of a resin selected from the group consisting of epoxyvinyl ester resins, epoxy resins, and unsaturated polyester resins.

5. A process according to claim 1, wherein the heat polymerization is carried out at a temperature of 100° to 160° C.

* * * * *